United States Patent [19]
Su

[11] 3,950,472
[45] Apr. 13, 1976

[54] MOLDING WOOD ARTICLES FROM AMMONIUM SALT-WOOD PARTICLE MIXTURES

[75] Inventor: Cheh Jen Su, Alsip, Ill.
[73] Assignee: Continental Can Company, Inc., New York, N.Y.
[22] Filed: Feb. 26, 1975
[21] Appl. No.: 553,387

[52] U.S. Cl. .............................................. 264/122
[51] Int. Cl.$^2$............................................ B29J 5/02
[58] Field of Search ............... 264/109, 122; 106/85

[56]   References Cited
       UNITED STATES PATENTS
2,779,683   1/1957   Gill, Jr................................ 264/124

Primary Examiner—Robert F. White
Assistant Examiner—J. R. Hall, Jr.
Attorney, Agent, or Firm—Paul Shapiro; Joseph E. Kerwin; William A. Dittmann

[57]    ABSTRACT

A method for making a molded wood products wherein wood particles are admixed with an ammonium salt of a weak acid (e.g., ammonium carbonate) and the salt-wood particle mixture is placed in a mold and compressed or otherwise molded at elevated temperatures (up to 200°C) and pressures (1000 to 10,000 psi).

5 Claims, No Drawings

MOLDING WOOD ARTICLES FROM AMMONIUM SALT-WOOD PARTICLE MIXTURES

BACKGROUND OF THE INVENTION

1. Field of the Invention

The present invention relates to a method of making a molded wood article and more particularly to the use of ammonium salts in the fabrication of molded wood articles having superior physical properties.

2. The Prior Art

It is known to the art e.g., U.S. Pat. Nos. 2,237,048 and 2,754,730 to fabricate molded articles such as plates, trays and cups from particles of cellulosic material, and in particular ligno-cellulosic materials, such as wood flour by blending the particles with a thermosetting resin powder such as melamine formaldehyde or a thermoplastic resin powder such as polyethylene and then compressing the mixture of resin and wood particles in a mold at elevated temperatures and pressures to form the desired wood article.

It is also known to the art, to prepare molded wood products from wood particles wherein the wood particles are treated with a variety of chemical agents such as a strong alkali (U.S. Pat. No. 2,708,637), an ammonium salt of a strong acid such as ammonium phosphate (U.S. Pat. No. 2,779,683), a dilute solution of a strong acid such as ammonium chloride (Tr. Ural'sk Lesotckh Inst. No. 19, 1966, pgs. 39–43) or liquid ammonia (U.S. Pat. No. 3,305,499). After treatment with these chemical agents the wood particles are placed in a mold of suitable shape and the particles are compressed at elevated temperatures and pressures to prepare the desired molded article.

Although the strength and integrity of molded wood products prepared using chemically treated wood particles have been reasonably good, they have not been considered commercially comparable to molded wood articles obtained using a resin binder.

SUMMARY OF THE INVENTION

In accordance with the present invention there is provided a method for producing a molded wood article from wood particles which articles exhibit physical properties which are at least equal to those prepared using resin binders wherein the wood particles are admixed with an ammonium salt of a weak acid and then the salt-wood particle mixture is molded in a mold into the desired article at elevated temperatures and pressures.

By the process of the present invention molded wood articles are prepared without the use of resin binders having physical properties comparable to articles fabricated using resin binders and substantially superior to articles prepared using wood particles chemically treated in accordance with the prior art.

PREFERRED EMBODIMENTS

As used herein the term "wood" includes within its meaning any cellulosic or ligno-cellulosic material. The cellulosic materials include, for example, flour, starch and the like; the ligno-cellulosic materials include, for example, the natural constituents of trees, plants and the like. The term "particles" includes within its meaning any comminuted wood material such as wood flour, sawdust and wood fibers.

In forming molded wood articles in accordance with the process of the present invention, it is preferred to use finely divided particles of wood, such as, for example, wood flour having a particle size in the range of about 10 mesh to about 100 mesh as measured on standard screens; a particle size range of about 20 mesh to about 80 mesh being preferred. Particles of somewhat larger size may be used, but in using conventional molding processes, these particles do not fit together well, resulting in products of low density and rough surface.

In molding wood particles in accordance with the process of the present invention, the particles are conveniently and simply admixed with solid particles of an ammonium salt of a weak acid. Generally the amount of ammonium salt that is admixed with the wood flour ranges from about 0.1 to about 10 percent by weight and preferably about 1 to about 3 percent based on weight of the oven dry (O.D.) weight of the wood flour. Illustrative examples of ammonium salts which are useful in the practice of the present invention are ammonium carbonate, ammonium bicarbonate, ammonium oxalate and ammonium oleate.

Generally the moisture content of dried wood flour ranges from about 2 to about 10 percent by weight of the wood flour. For best results during molding, the moisture content of the wood flour-ammonium salt mixture is adjusted to between about 15 to about 25% by weight based on the weight of the mixture, prior to molding.

After mixing and adjustment of the moisture content, the salt-wood particle mixture is charged to a mold of selected shape and compressed in the mold at a pressure in the range of 1,000 pounds per square inch (psi) to 10,000 psi and preferably about 2,000 psi to about 5,000 psi for about 1 to about 10 minutes and preferably about 2 to about 5 minutes to obtain the desired molded wood article. During the molding operation, the mold is maintained at an elevated temperature above room temperature and generally in the range of about 80° to about 200°C. Temperatures higher than 200°C are generally avoided as these higher temperatures have a detrimental effect on the physical properties of the final molded wood article.

After the wood article has been molded, the article is removed from the mold and allowed to stand to permit the removal of any excess moisture remaining in the molded article. To accelerate any water removal, the molded article is placed in a heating zone, such as an air oven, to effect removal of excess water from the molded article. Generally temperatures ranging from 100° to 150°C for 10 to 60 minutes are sufficient to effect the removal of any excess moisture.

The following Examples are illustrative of the invention.

EXAMPLE I

In a test run, 5 grams of oven dried (O.D.) wood flour having a particle size range of 30–60 mesh was mixed with 2% by weight ammonium carbonate based on the O.D. weight of the wood flour. The wood flour had a moisture content of 4 to 6% and additional water was added to the salt-wood flour mixture so that the total moisture content of the molding mixture was 20% by weight of the mixture. The moisture adjusted salt-wood flour mixture was placed in a 3 inch diameter positive compression mold preheated to 150°C and the wood flour compressed into flat sheet of 0.4 inch thickness at 4,500 psi for 3 minutes. The mold was cooled to room temperature without relieving the pressure and the molded wood sheet removed. The molded wood sheets were air dried at room temperature for 48 hours. A dumbbellcutter was used to cut the molded sheet into 0.125 inch wide specimens. The tensile strength at break of the molded sheet sample was measured with an Instron machine at a 0.2 inch/minute cross-head speed.

The tensile strengths of molded sheet which had been treated with ammonium carbonate in accordance with the procedure of Example I are recorded in Table I below.

For purposes of comparison, a series of molded wood sheets were prepared in an identical manner to that described in Example I except that the wood flour was admixed with ammonium salts of strong acids as well as resin binders. The tensile strengths of molded sheets prepared in this manner are also recorded in Table I. These comparative runs are designated in Table I by the symbol "C".

TABLE I

| Run No. | Ammonium Salt or Binder | Tensile Strength (psi) |
|---|---|---|
| 1 | Ammonium Carbonate | 2070 |
| $C_1$ | Ammonium Phosphate, $(NH_4)_2 HPO_4$ | 618 |
| $C_2$ | Ammonium Sulfate | 626 |
| $C_3$ | Ammonium Chloride | 710 |
| $C_4$ | Phenol Formaldehyde Resin Molding Powder | 2010 |
| $C_5$ | Melamine Formaldehyde Resin Molding Powder | 1070 |
| $C_6$ | Polyethylene * | 566 |

* 55 Micron powder, density 0.948, melt index 0.4

By reference to Table I, it is immediately apparent that wood sheet molded from wood particles admixed with an ammonium salt of a weak acid e.g., ammonium carbonate (Run No. 1) has substantially greater tensile strength than wood sheet molded from wood particles admixed with ammonium salts of strong acids, e.g., ammonium phosphate, ammonium sulfate, ammonium chloride (Test Nos. $C_1$–$C_3$) and has a tensile strength at least equal to wood sheets molded from wood particles admixed with resin binders e.g., phenol formaldehyde resin, malamine formaldehyde resin and polyethylene (Test Nos. $C_4$–$C_6$).

EXAMPLE II

The procedure of Example I was repeated with the exception that 1% by weight of ammonium carbonate and ammonium oxalate was substituted for ammonium carbonate in separate runs and the salt-wood flour mixture was compressed at 2800 psi instead of 4500 psi.

The tensile strengths of molded sheet which had been admixed with ammonium carbonate and ammonium oxalate in accordance with the procedure of the Example II are recorded in Table II below.

For purposes of comparison, molded wood sheets were prepared in an identical manner to that described in the Example II except that the wood flour was admixed with ammonium salts of strong acids. The tensile strengths of molded sheets prepared in this manner are also recorded in Table II. These comparative runs are designated in the Table by the symbol C.

TABLE II

| Run No. | Ammonium Salt | Tensile Strength (psi) |
|---|---|---|
| 1 | Ammonium Carbonate * | 864 |
| 2 | Ammonium Oxalate | 741 |
| $C_1$ | Ammonium Sulfate | 370 |
| $C_2$ | Ammonium Chloride | 409 |

* Moisture content adjusted to 19.5% by weight

What is claimed is:

1. In the method for preparing molded wood articles comprising molding wood particles into a wood article in a mold at a temperature up to about 200°C, and a pressure of about 1000–10,000 psi, the improvement which comprises admixing with the wood particles prior to molding an ammonium salt selected from the group consisting of ammonium oxalate and ammonium salts of weak acids.

2. The method of claim 1 wherein the ammonium salt is admixed with the wood particles at a concentration ranging from about 0.1 to about 10% by weight based in the dry weight of the wood particles.

3. The method of claim 1 wherein the moisture content of the salt-wood particle mixture is adjusted to between about 15 to about 25 percent by weight of the mixture prior to molding.

4. The method of claim 1 wherein the ammonium salt is ammonium carbonate.

5. The method of claim 1 wherein the wood particles are wood flour having a particle size ranging from about 10 to about 100 mesh.

* * * * *